(12) United States Patent
Rotzinger et al.

(10) Patent No.: US 7,375,149 B2
(45) Date of Patent: May 20, 2008

(54) STABILIZATION OF ORGANIC MATERIALS

(75) Inventors: Bruno Rotzinger, Birsfelden (DE); Kurt Hoffmann, Weitenau-Steinen (DE); Dietmar Mäder, Freiburg (DE); Neil Dunski, St. Louis, MO (US)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 344 days.

(21) Appl. No.: 10/526,106

(22) PCT Filed: Sep. 2, 2003

(86) PCT No.: PCT/EP03/09716
§ 371 (c)(1), (2), (4) Date: Feb. 25, 2005

(87) PCT Pub. No.: WO2004/024810
PCT Pub. Date: Mar. 25, 2004

(65) Prior Publication Data
US 2006/0167146 A1    Jul. 27, 2006

(30) Foreign Application Priority Data
Sep. 11, 2002 (EP) .................. 02405786

(51) Int. Cl.
*C08K 5/15* (2006.01)
(52) U.S. Cl. .................. 524/110
(58) Field of Classification Search .................. 524/110
See application file for complete search history.

(56) References Cited

U.S. PATENT DOCUMENTS

| | | | |
|---|---|---|---|
| 4,696,803 A | 9/1987 | Nieh | 423/228 |
| 4,696,950 A | 9/1987 | Cox | 521/57 |
| 4,782,105 A | 11/1988 | Ravichandran et al. | 524/236 |
| 4,898,901 A | 2/1990 | Ravichandran et al. | 524/237 |
| 5,516,920 A | 5/1996 | Nesvadba et al. | 549/307 |
| 5,807,504 A | 9/1998 | Krockenberger et al. | 252/400.24 |
| 5,922,794 A | 7/1999 | Prabhu et al. | 524/236 |
| 6,787,591 B2 | 9/2004 | Koch et al. | 524/102 |

FOREIGN PATENT DOCUMENTS

| | | |
|---|---|---|
| EP | 0054268 | 6/1982 |
| EP | 0875530 | 11/1998 |
| GB | 906174 | 9/1962 |
| GB | 1329541 | 9/1973 |
| GB | 1352347 | 5/1974 |
| WO | 95/23182 | 8/1995 |
| WO | 00/24963 | 5/2000 |

*Primary Examiner*—Peter D. Mulcahy
(74) *Attorney, Agent, or Firm*—Tyler A. Stevenson

(57) ABSTRACT

The invention describes novel mixtures comprising i) a processing stabilizer selected from the group consisting of hydroxylamine stabilizers, nitrone stabilizers, benzofuran-2-one stabilizers and/or a compound of the formula I wherein $R_2$ is $C_7$-$C_{30}$alkyl, $R_3$ is $C_1$-$C_{30}$alkyl, and ii) an antistatic agent selected from the group consisting of an ethoxylated amine and/or an ethoxylated amide, as stabilizers for protecting organic materials, in particular synthetic polymers, against oxidative, thermal or lightinduced degradation

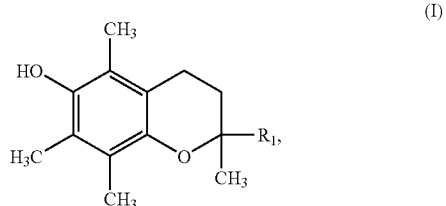

$R_1$ is —$(CH_2)_3$—CH—$(CH_2)_3$—CH—$(CH_2)_3$—CH—$(CH_2)_3$,
| | | |
CH$_3$ CH$_3$ CH$_3$ —$CH_2$—$CH_2$—O—$R_2$,    —$CH_2$—$CH_2$—S—$R_3$   or

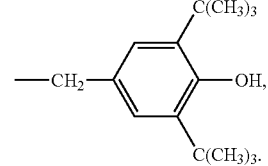

13 Claims, No Drawings

STABILIZATION OF ORGANIC MATERIALS

The present invention relates to novel mixtures, to compositions comprising an organic material, preferably a polymer or a lubricant, and to the novel mixtures, as well as the use thereof for stabilizing organic materials against oxidative, thermal or light-induced degradation.

EP-A-0 054 268 discloses a process for the preparation of Ziegler-Natta catalysed olefin polymers. A non-volatile acid acceptor which is soluble in polyolefins is added to a film grade polyolefin resin composition to prevent gel streaking/pinstriping or corrosion during film extrusion processes. The acid acceptor belongs to the group of ethoxylated fatty amines.

WO-A-95/23182 discloses a stabilizer mixture for organic materials containing a chromane derivative (vitamin E), an organic phoshite or phosphonite and an amine like for example tri-isopropanolamine.

These known stabilizer mixtures do not in every respect satisfy the high requirements to be met by a stabilizer mixture, especially as regards antistatic properties, storage stability, water absorption, sensitivity to hydrolysis, stabilisation during processing, colour behaviour, volatility, migration behaviour, compatibility and enhanced light stabilisation. There is therefore still a need for effective stabilizers for organic materials that are sensitive to oxidative, thermal or light-induced degradation.

It has now been found that a mixture comprising at least one hydroxylamine stabilizer, one nitrone stabilizer, one benzofuran-2-one stabilizer and/or one α-tocopherol (vitamin E) and at least one ethoxylated amine and/or one ethoxylated amide is especially suitable as a stabilizer for organic materials that are sensitive to oxidative, thermal or light-induced degradation.

The present invention accordingly relates to a mixture comprising
  i) a processing stabilizer selected from the group consisting of hydroxylamine stabilizers, nitrone stabilizers and benzofuran-2-one stabilizers, and
  ii) an antistatic agent selected from the group consisting of an ethoxylated amine and/or an ethoxylated amide.

The present invention accordingly also relates to a mixture comprising
  i) a compound of the formula I

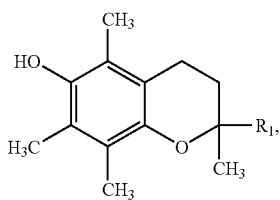

wherein
$R_1$ is

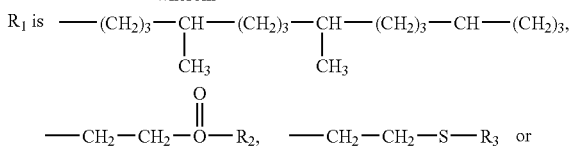

$R_2$ is $C_7$-$C_{30}$alkyl,
$R_3$ is $C_1$-$C_{30}$alkyl, and
  ii) an antistatic agent selected from the group consisting of an ethoxylated amide and/or a compound of the formula V

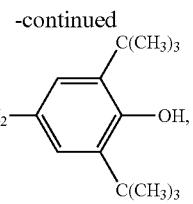

wherein, when m is 1,
$R_6$ is $C_4$-$C_{24}$alkyl, $C_4$-$C_{24}$alkenyl or phenyl, and
when m is 2,
$R_6$ is $C_1$-$C_{24}$alkylene, $C_4$-$C_{24}$alkenylene or phenylene,
$R_7$ is hydrogen, $C_1$-$C_{24}$alkyl or

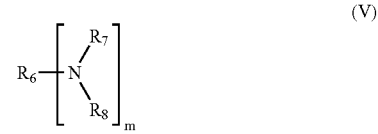

m is 1 or 2, and
n is 1, 2, 3, 4 or 5.

Alkyl having from 1 to 30 carbon atoms is a branched or unbranched radical, such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, isooctyl, 2-ethylhexyl, 1,1,3-trimethylhexyl, 1,1,3,3-tetramethylpentyl, nonyl, isononyl, decyl, isodecyl, undecyl, isoundecyl, dodecyl, isododecyl, 1,1,3,3,5,5-hexamethylhexyl, tridecyl, tetradecyl, pentadecyl, hexadecyl, heptadecyl, octadecyl(stearyl), icosyl or docosyl.

Alkenyl having 4 to 24 carbon atoms is a branched or unbranched radical such as, for example, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 4 to 18, especially 4 to 12, for example 4 to 6 carbon atoms.

$C_1$-$C_{24}$Alkylene is a branched or unbranched radical, for example methylene, ethylene, propylene, trimethylene, tetramethylene, pentamethylene, hexamethylene, heptamethylene, octamethylene, decamethylene, dodecamethylene or octadecamethylene.

$C_4$-$C_{24}$Alkenylene is, for example, butenylene, octenylethylene or dodecenylethylene. $C_2$-$C_8$-Alkenylene is preferred.

Of interest are mixtures comprising in addition, besides components (i) and (ii), further additives selected from the group consisting of phenolic antioxidants, further processing stabilizers, light-stabilizers and acid scavengers.

Of special interest are mixtures comprising as a further component (iii) a phosphite, a phosphonite or a triarylphosphine.

Phosphites or phosphonites of special interest are for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethyl-hexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, 9,10-dihydro-9-oxa-10-phosphaphenanthrene-10-oxide [Sanko HCA®] or 2,4,8,10-tetra-tert-butyl-6-[3-(3-methyl-4-hydroxy-5-tert-butyl-phenyl)propoxy]dibenzo[d,f][1,3,2]dioxaphosphepin [Sumilizer GP®].

Likewise of interest are mixtures wherein component (iii) is tris(2,4-di-tert-butylphenyl)phosphite, bis(2,4-di-tert-butyl-6-methylphenyl)ethyl phosphite, bis(2,4-di-tert-butylphenyl)pentaerythritol diphosphite, bis(2,4-dicumylphenyl)pentaerythritol diphosphite, tris(nonylphenyl)phosphite or tetrakis(2,4-di-tert-butylphenyl)4,4'-biphenylene diphosphonite.

The following compounds are examples of hydroxylamine stabilizers that are especially suitable as component (i) in the mixture according to the invention: N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

Of special interest are mixtures wherein the hydroxylamine stabilizer as component (i) is a compound of the formula II

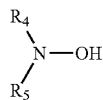

(II)

wherein $R_4$ and $R_5$ are each independently of the other $C_8$-$C_{18}$alkyl.

The hydroxylamine stabilizers of the formula II are known in the literature and disclosed for example in U.S. Pat. No. 4,782,105.

Preference is given to mixtures wherein the hydroxylamine stabilizer as component (i) is a N,N-di(alkyl)-hydroxylamine produced by the direct oxidation of N,N di (hydrogenated tallow)-amine.

Nitrone stabilizers of special interest are for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

Of interest are mixtures wherein the nitrone stabilizer as component (i) is a compound of the formula III

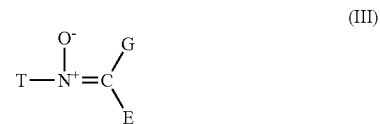

(III)

wherein
T is $C_8$-$C_{18}$alkyl,
G is hydrogen, methyl or ethyl, and
E is $C_5$-$C_{17}$alkyl.

The nitrone stabilizers of the formula III are known in the literature and disclosed for example in U.S. Pat. No. 4,898,901.

The following compounds are examples of benzofuran-2-one stabilizers that are especially suitable as component (i) in the mixture according to the invention: 3-[4-(2-acetoxyethoxy)-phenyl]-5,7-di-tert-butyl-benzofuran-2-one; 5,7-di-tert-butyl-3-[4-(2-stearoyloxyethoxy)phenyl]-benzofuran-2-one; 3,3'-bis[5,7-di-tert-butyl-3-(4-[2-hydroxyethoxy]phenyl)-benzofuran-2-one]; 5,7-di-tert-butyl-3-(4-ethoxyphenyl)benzofuran-2-one; 3-(4-acetoxy-3,5-dimethylphenyl)-5,7-di-tert-butyl-benzofuran-2-one; 3-(3,5-dimethyl-4-pivaloyloxyphenyl)-5,7-di-tert-butyl-benzofuran-2-one; 5,7-di-tert-butyl-3-phenyl-benzofuran-2-one; 5,7-di-tert-butyl-3-(3,4-dimethylphenyl)-benzofuran-2-one; 5,7-di-tert-butyl-3-(2,3-dimethylphenyl)-benzofuran-2-one or 5-tert-octyl-3-(2-acetyl-5-tert-octylphenyl)-benzofuran-2-one.

Of special interest are mixtures wherein the benzofuran-2-one stabilizer as component (i) is a compound of the formula IV

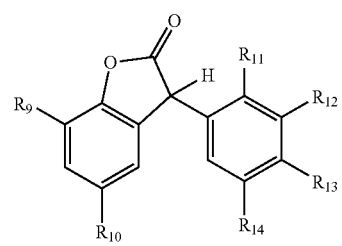

(IV)

wherein
$R_9$ is hydrogen or $C_1$-$C_8$alkyl,
$R_{10}$ is $C_1$-$C_{12}$alkyl,
$R_{11}$ is hydrogen, $C_1$-$C_4$alkyl or $C_2$-$C_8$alkanoyl,
$R_{12}$ is hydrogen or $C_1$-$C_8$alkyl,
$R_{13}$ is hydrogen, $C_1$-$C_4$alkyl or $C_1$-$C_4$alkoxy, and
$R_{14}$ is hydrogen or $C_1$-$C_{12}$alkyl.

$C_2$-$C_8$alkanoyl is for example acetyl, propionyl, butanoyl, pentanoyl, hexanoyl, heptanoyl or octanoyl. Acetyl is preferred.

Especially preferred benzofuran-2-one stabilizers are for example 5,7-di-tert-butyl-3-phenylbenzofuran-2-one; 5,7-di-tert-butyl-3-(3,4-dimethylphenyl)-benzofuran-2-one; 5,7-di-tert-butyl-3-(2,3-dimethylphenyl)-benzofuran-2-one or 5-tert-octyl-3-(2-acetyl-5-tert-octylphenyl)-benzofuran-2-one.

The benzofuran-2-one stabilizers of the formula IV are known in the literature and disclosed for example in U.S. Pat. No. 5,516,920.

Of interest are mixtures wherein component (i) is a compound of the formula I, wherein $R_1$ is

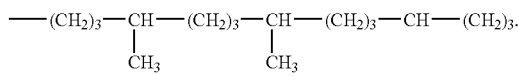

This compound is vitamin E which is commercially available as Irganox E201® [Ciba Specialty Chemicals Inc.].

Of interest are also mixtures comprising as component (ii) a compound of the formula V

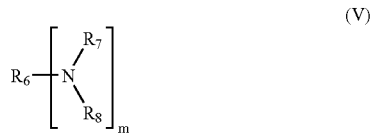

wherein, when m is 1,
$R_6$ is $C_4$-$C_{24}$alkyl, $C_4$-$C_{24}$alkanoyl, $C_4$-$C_{24}$alkenyl, $C_4$-$C_{24}$alkenoyl, phenyl or benzoyl, and when m is 2,
$R_6$ is $C_1$-$C_{24}$alkylene, $C_4$-$C_{24}$alkenylene or phenylene,
$R_7$ is hydrogen, $C_1$-$C_{24}$alkyl or

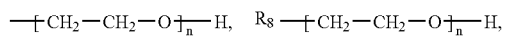

m is 1 or 2, and
n is 1, 2, 3, 4 or 5.

Alkyl having from 4 to 24 carbon atoms is a branched or unbranched radical, such as, for example, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, isooctyl, 2-ethylhexyl, 1,1,3-trimethylhexyl, 1,1,3,3-tetramethylpentyl, nonyl, isononyl, decyl, isodecyl, undecyl, isoundecyl, dodecyl, isododecyl, 1,1,3,3,5,5-hexamethylhexyl, tridecyl, tetradecyl, pentadecyl, hexadecyl, heptadecyl, octadecyl (stearyl), icosyl or docosyl.

Alkanoyl having from 4 to 24 carbon atoms is a branched or unbranched radical, such as, for example, n-butanoyl, sec-butanoyl, isobutanoyl, 2-ethylbutanoyl, n-pentanoyl, isopentanoyl, 1-methylpentanoyl, 1,3-dimethylbutanoyl, n-hexanoyl, 1-methylhexanoyl, n-heptanoyl, isoheptanoyl, 1-methylheptanoyl, 3-methylheptanoyl, n-octanoyl, isooctanoyl, 2-ethylhexanoyl, nonanoyl, isononanoyl, decanoyl, isodecanoyl, undecanoyl, isoundecanoyl, dodecanoyl, isododecanoyl, tridecanoyl, tetradecanoyl, pentadecanoyl, hexadecanoyl, heptadecanoyl, octadecanoyl or docosanoyl.

Alkenyl having 4 to 24 carbon atoms is a branched or unbranched radical such as, for example, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 4 to 18, especially 4 to 12, for example 4 to 6 carbon atoms.

Alkenoyl having 4 to 24 carbon atoms is a branched or unbranched radical such as, for example, 2-butenoyl, 3-butenoyl, isobutenoyl, n-2,4-pentadienoyl, 3-methyl-2-butenoyl, n-2-octenoyl, n-2-dodecenoyl, iso-dodecenoyl, n-2-octadecenoyl or n-4-octadecenoyl. Preference is given to alkenoyl having 4 to 18, especially 4 to 12, for example 4 to 6 carbon atoms.

$C_1$-$C_{24}$Alkylene is a branched or unbranched radical, for example methylene, ethylene, propylene, trimethylene, tetramethylene, pentamethylene, hexamethylene, heptamethylene, octamethylene, decamethylene, dodecamethylene or octadecamethylene.

$C_4$-$C_{24}$Alkenylene is, for example, butenylene, octenylethylene or dodecenylethylene. $C_2$-$C_8$-Alkenylene is preferred.

Preference is given to mixtures comprising as component (ii) a compound of the formula V, wherein
$R_6$ is $C_{11}$-$C_{20}$alkyl or $C_{11}$-$C_{20}$alkanoyl,
$R_7$ is hydrogen or

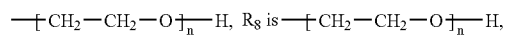

m is 1, and
n is 1 or 2.

The ethoxylated amines or the ethoxylated amides of the formula V are known in the literature and disclosed for example in GB-B-906 174. Ethoxylated amines and ethoxylated amides are commercially available, for example, stearyldiethanolamine [Armostat 1800®, Akzo Nobel Chem. Inc.], $C_{13}$/$C_{15}$alkyldiethanolamine [Atmer 163®, Uniqema or Ciba Specialty Chemicals Inc.] or Atmer 167® [compound of the formula Vb, wherein $R_6$ is $C_{11}$alkyl and $R_7$ and $R_8$ are —$CH_2CH_2OH$].

Preferred mixtures comprise as component (i) a N,N-di(alkyl)-hydroxylamine produced by the direct oxidation of N,N-di(hydrogenated tallow)amine; and as component (ii) a $C_{13}$-$C_{18}$-alkyldiethanolamine.

Especially preferred mixtures comprise as component (i) a compound of the formula I wherein

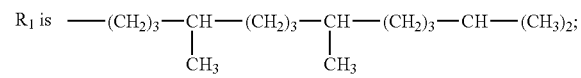

and as component (ii) a $C_{13}$-$C_{18}$-alkyldiethanolamine.

Preference is given to mixtures wherein the weight ratio of components (i):(ii) is from 100:0.01 to 0.01:100.

Preference is given likewise to mixtures wherein the weight ratio of components (i):(ii):(iii) is from 100:01:0.01 to 0.01:1:100.

The mixture of components (i) and (ii) and optionally (iii) may comprise further additives, typically the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl) disulfide.

1.5. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.6. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.7. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.8. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.10. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.11. Acylaminophenols, for example 4-hydroxylauranilide, 4-hydroxystearanilide, octyl N-(3,5-di-tert-butyl-4-hydroxyphenyl)carbamate.

1.12. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl]oxamide (NaugardXL-1® supplied by Uniroyal).

1.17. Ascorbic Acid (Vitamin C)

1.18. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis-(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

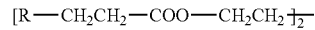

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl 3,5-di-tert-butyl-4-hydroxybenzoate, hexadecyl3, 5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl)nitrilotriacetate, tetrakis(2, 2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butyl-benzyl)malonate, 3-n-octyl-7,7,9,9-tetramethyl-1,3,8-triazaspiro[4.5]decan-2, 4-dione, bis(1-octyloxy-2,2,6,6-tetramethylpiperidyl)sebacate, bis(1-octyloxy-2,2,6,6-tetramethylpiperidyl)-succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)-ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cyclounde-cyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl) ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Thiosynergists, for example, dilauryl thiodipropionate or distearyl thiodipropionate.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, zinc octoate, magnesium behenate, magnesium stearate, sodium ricinoleate and potassium palmitate, antimony pyrocatecholate or zink pyrocatecholate.

7. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Especially preferred are 1,3:2,4-bis(3',4'-dimethylbenzylidene)sorbitol, 1,3:2,4-di(paramethyldibenzylidene)sorbitol, und 1,3:2,4-di (benzylidene)sorbitol.

8. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

9. Triarylphosphines, for example triphenylphosphine.

10. Polymeric dispersing or solvating agents, for example polymeric dispersing or solvating agents having amphiphilic properties which have polar and nonpolar groups in the same molecule and are, for example, dispersing or solvating agents based on polyethylene glycols (PEG), polyacrylates, polysiloxanes, polyvinylacetate or block copolymers containing at least one block copolymer based on acrylate, acrylic acid or methacrylate.

The polymeric dispersing or solvating agents having amphiphilic properties have at least two different polarities within one polymer molecule. Oligomeric structures are also possible. They are usually copolymers, for example random copolymers, or block copolymers which can be prepared by known polymerisation reactions, for example by radical or anionic polymerisation, by polycondensation reactions, such as by reaction of end-functionalised oligomeric or comb polymers, which polymers may be prepared e.g. by graft reaction. Block copolymers are, for example, diblock copolymers (A-B type) or triblock copolymers (A-B-A or A-B-C type) and so-called tapered structures.

Diblock copolymers (A-B type) are, for example, poly (styrene-b-methylmethacrylate), poly-(styrene-b-tert-butylmethacrylate), poly(styrene-b-methylacrylate), poly(styrene-b-n-butylacrylate), poly(styrene-b-tert-butylacrylate), poly(styrene-b-butadiene), poly(styrene-b-isoprene[1,4-addition]), tapered block copolymer poly(styrene-b-butadiene), tapered block copolymer poly(styrene-b-ethylene), poly(styrene-b-2-vinylpyridine), poly(styrene-b-4-vinyl-pyridine), poly(styrene-bis-tert-butylstyrene), poly(styrene-b-dimethylsiloxane), poly(butadiene-b-dimethylsiloxane), poly(butadiene[1,4-addition]-b-methylmethacrylate), poly(isoprene[1-4-addition]-b-methylmethacrylate), poly(butadiene-b-tert-butylmethacrylate), poly(butadiene-b-tert-butylacrylate), poly(isoprene-b-2-vinylpyridine), poly(butadiene-b-4-vinylpyridine), poly(styrene-b-methylmethacrylate), poly(methylmethacrylate-b-tert-butylmethacrylate), poly(methylmethacrylate-b-tert-butylacrylate), poly(tert-butylacrylate-b-methylmethacrylate), poly(n-butylacrylate-b-methylmethacrylate), poly(2-vinylpyridine-b-methylmethacrylate), poly(tert-butylmethacrylate-b-tert-butylacrylate), poly(tert-butylmethacrylate-b-2-vinylpyridine), poly(tert-butylmethacrylate-b-4-vinylpyridine), poly(tert-butylacrylate-b-2-vinylpyridine), poly(2-vinylpyridine-b-4-vinylpyridine), poly(ethylene-b-methylmethacrylate), poly(ethylene-b-2-vinylpyridine) or poly(ethylene-b-4-vinylpyridine).

Triblock copolymers of the A-B-A type are, for example, poly(methylmethacrylate-b-styrene-b-methylmethacrylate), poly(tert-butylmethacrylate-b-styrene-b-tert-butylmethacrylate), poly(tert-butylacrylate-b-styrene-b-tert-butylacrylate), poly(2-vinylpyridine-b-styrene-b-tert-butylacrylate), poly(4-vinylpyridine-b-styrene-b-4-vinylpyridine), poly(butadiene[1,2-addition]-b-styrene-b-butadiene[1,2-addition]), poly(butadiene[1,4-addition]-b-styrene-b-butadiene[1,4-addition]), poly(styrene-b-butadiene[1,4- and 1,2-addition]-b-styrene), poly(methylmethacrylate-b-butadiene[1,4- or 1,2-addition]-b-methylmethacrylate), poly(tert-butylmethacrylate-b-methylmethacrylate-b-tert-butylmethacrylate), poly(tert-butylacrylate-b-methylmethacrylate-b-tert-butylacrylate), poly(methylmethacrylate-b-2-vinylpyridine-b-methylmethacrylate), poly(4-vinylpyridine-b-methylmethacrylate-b-4-vinylpyridine), poly(methylmethacrylate-b-tert-butylacrylate-b-methylmethacrylate), poly(methylmethacrylate-b-n-butylacrylate-b-methylmethacrylate), poly(tert-butylmethacrylate-b-tert-butylacrylate-b-tert-butylmethacrylate), poly(2-vinylpyridine-b-tert-butylacrylate-b-2-vinylpyridine), poly(4-vinylpyridine-b-tert-butylacrylate-b-4-vinylpyridine), poly(styrene-b-n-butylacrylate-b-styrene), poly(styrene-b-ethylacrylate-b-styrene), poly(styrene-b-ethylene-b-styrene), poly(styrene-b-butylene-b-styrene), poly(ethylene oxide-b-styrene-b-ethylene oxide), poly(styrene-b-ethylene oxide-b-styrene) or poly(styrene-b-acrylic acid-b-styrene).

Triblock copolymers of the A-B-C type are, for example, poly(styrene-b-butadiene-b-2-vinylpyridine), poly(styrene-b-butadiene-b-4-vinylpyridine), poly(styrene-b-tert-butylmethacrylate-b-2-vinylpyridine), poly(styrene-b-tert-butylmethacrylate-b-4-vinylpyridine), poly(styrene-b-2-vinylpyridine-b-4-vinylpyridine), poly(butadiene-b-styrene-b-methylmethacrylate), poly(styrene-b-butadiene-b-methylmethacrylate), poly(styrene-b-2-vinylpyridine-b-ethyl oxide), poly(styrene-b-tert-butylacrylate-b-methylmethacrylate), poly(styrene-b-acrylic acid-b-methylmethacrylate), poly(styrene-b-a-methylstyrene-b-methylmethacrylate) or poly(styrene-b-a-methylstyrene-b-tert-butylacrylate).

Long-chain block copolymers of particular interest have a chain length of more than 10 carbon atoms, preferably of $C_{12}$-$C_{18}$ carbon atoms.

Particularly suitable dispersing or solvating agents having amphiphilic properties are, for example, poly(butadienemethylmethacrylate), poly(isoprenemethylmethacrylate), poly(ethylenemethylmethacrylate), poly(styrene-4-vinylpyridine), poly(styrene-2-vinylpyridine), poly(styrene-n-butylacrylate), poly(styrene-tert-butylacrylate), poly(styrene sodium acrylate), poly(styrene-acrylic acid), poly(methylmethacrylate sodium acrylate), poly(methylmethacrylate sodium methacrylate), poly(ethylene oxide-ϵ-caprolactone), poly(2-vinylpyridine ethylene oxide), poly(butadiene-ethylene oxide), poly(butadiene sodium acrylate), poly(ethylene-ethylene oxide), poly(ethylene-propylene oxide), poly(styrene-ethylacrylate-styrene), poly(ethylene oxide-styrene-ethylene oxide), poly(styrene-acrylic acid-styrene), poly(styrenebuta-dienemethylmethacrylate), poly(styrene-vinylpyridine-ethylene oxide), poly(styrene-4-vinyl-benzoic acid), poly(styrene-polyglycidyl-methacrylate), poly(ethylene-glycidyl methacrylate), poly(propylene acrylic acid), poly(ethylene acrylic acid), poly(propylenemaleic anhydride), poly(ethylenemaleic anhydride), poly(styrenemaleic anhydride), polymethacrylic acid-polyalkylene oxide block copolymers, for example according to EP-A-0 859 028, polysiloxane-polyoxyalkylene, copolymers of maleates and styrene or styrene derivatives, for example according to EP-A-0 791 024, polystyrene-polysiloxane block copolymers, polyacrylate-polysiloxane block copolymers and cyclosiloxane-radiale copolymers, prepared e.g. using ATRP technology according to EP-A-0 870 774, methylacrylate-styrene copolymer, methylmethacrylate-styrene, polybutadiene-methylacrylates, prepared by nitroxyl-initiated radical polymerisation according to EP-A-0 135 280.

The polyalkylene oxides are preferably polyethylene oxide, polypropylene oxide and polybutylene oxide.

Suitable block copolymers are, for example, polyacrylate/polystyrene, polymethacrylate/polyethylene oxide, polyacrylate/polyethylene oxide, polyacrylate/polyethylene, polyvinyl acetate/polyethylene, polystyrene/polybutadiene, polyacrylate/polybutadiene, polyacrylate/polyisoprene, polyisoprene/polymethylmethacrylate, polyethylene/polymethylmethacrylate, polyethylene/polyethylene oxide or polyethylene/polypropylene oxide.

Particularly suitable dispersing or solvating agents having amphiphilic properties are, for example, poly(styrene-bis-sodium acrylate), poly(styrene-bis-acrylic acid), poly(styrene-bis-sodium methacrylate), poly(styrene-bis-N-methyl-4-vinylpyridinium iodide), poly(isoprene-bis-N-methyl-2-vinylpyridinium iodide), poly(styrene-bis-ethylene oxide), poly(methylmethacrylate-bis-sodium acrylate), poly(methylmethacrylate-bis-sodium methacrylate), poly(methylmethacrylate-bis-ethylene oxide), poly(tert-butylmethacrylate-bis-ethylene oxide), poly(methylmethacrylate-bis-N-methyl-4-vinylpyridinium iodide), poly(ethylene oxide-bis-lactate), poly(2-vinylpyridine-bis-ethylene oxide), poly(butadiene-bis-sodium acrylate), poly(butadiene-bis-sodium methacrylate), poly(butadiene-bis-N-methyl-4-vinylpyridinium iodide), poly(butadiene-bis-ethylene oxide), poly(ethylene-bis-ethylene oxide) or poly(ethylene-bis-propylene oxide).

Particularly preferred polysiloxanes containing long-chain side groups are disclosed, inter alia, in U.S. Pat. No. 5,387,467.

Other likewise preferred dispersing or solvating agents based on polyacrylates are described, inter alia, in U.S. Pat. No. 5,133,898.

Particularly preferred dispersing or solvating agents based on acrylate are, for example, Tegomer DA 100®, Tegomer DA 102® or Wax P 121® of Th. Goldschmidt AG, Germany.

11. Other additives, for example, plasticisers, lubricants, emulsifiers, pigments, rheology additives, catalysts, flow-control agents, optical brighteners, flameproofing agents, antistatic agents and blowing agents.

Preferred further additives are for example phenolic antioxidants, light-stabilizers, processing stabilizers and/or acid scavengers.

The mixture of components (i) and (ii) and optionally further additives is suitable for stabilizing organic materials against oxidative, thermal or light-induced degradation. Special attention is drawn to their excellent action as antioxidant in the stabilization of organic materials.

Illustrative examples of such materials are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature.

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyIsobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

Further objects of the invention are therefore compositions comprising a) an organic material which is susceptible to oxidative, thermal or light-induced degradation, and b) at least a mixture of component (i) and (ii).

Preferred organic materials are natural, semi-synthetic or, preferably, synthetic polymers.

Particularly referred organic materials are synthetic polymers, most preferably thermoplastic polymers. Especially preferred organic materials are polyacetals, polyolefins such as polypropylene or polyethylene, polyether/polyurethanes, polyesters such as polybutylene terephthalate, polycarbonates or vulcanisates, To be singled out for special mention is the efficacy of the novel mixtures against oxidative or thermal degradation, especially under the action of heat which occurs during the processing of thermoplasts. The mixtures of this invention are therefore admirably suited for use as processing stabilizers.

The mixture of component (i) and (ii) and optionally further additives, for example typically those as outlined above, will preferably be added to the organic material to be stabilized in concentrations of 0.001 to 5%, preferably 0.002 to 3%, typically 0.001 to 1%, based on the weight of said material.

The co-stabilizers are added, for example, in concentrations of from 0.01 to 10%, based on the total weight of the organic material to be stabilized.

Further preferred compositions also comprise, besides components (i) and (ii), further additives selected from the group consisting of phenolic antioxidants, processing stabilizers, light-stabilizers and acid scavengers. Especially preferred acid scavengers are for example salts of carboxyl acids like for example calcium stearate, zinc stearate or zinc octoate; or metal oxides.

Also of interest as yet further additives in the compositions according to the invention are alkaline earth metal salts of higher fatty acids or lactic acid, such as, for example, calcium stearate, calcium lactate or calcium stearoyl-2-lactylate.

The terms calcium lactate and calcium stearoyl-2-lactylate are to be understood as meaning those compounds as disclosed in U.S. Pat. No. 4,366,280. A further description of calcium lactate may be found, for example, in The Merck Index, Eleventh Edition, 1683, page 254 (1989). A useful description of calcium stearoyl-2-lactylate may be found, for example, in The Merck Index, Eleventh Edition, 1711, page 257 (1989). These known commercially available compounds are, for example, used also as additives in foodstuffs. They are available from the American Ingredients Company, PATCO Polymer Additives Division, Kansas City, USA, under the following tradenames: Pationic 1230® (calcium lactate); Pationic 1240® (mixture of calcium lactate and calcium hydroxide); Pationic 930® (calcium stearoyl-2-lactylate); Pationic 940® (mixture of calcium stearoyl-2-lactylate and calcium hydroxide); Pationic 1250® (mixture of calcium lactate, calcium stearoyl-2-lactylate and calcium hydroxide).

Especially preferred co-additives are phenolic antioxidants (point 1.1 to 1.16 of the list), UV absorbers and light-stabilizers (point 2 of the list), for example sterically hindered amines (HALS, point 2.6 of the list).

Components (i) and (ii), and also where applicable further additives, are incorporated into the organic polymeric material according to known methods, for example before or during the shaping, or alternatively by applying a solution or dispersion of the stabilizer mixture to the organic polymeric material, if necessary with subsequent evaporation of the solvent. The stabilizer mixture of components (i) and (ii), and where applicable further additives, may also be added to the organic polymeric materials to be stabilized in the form of a master batch that contains the mixture in a concentration of, for example, from 2.5 to 25% by weight.

The stabilizer mixture of components (i) and (ii), and where applicable further additives, may also be added before or during polymerization or before crosslinking.

The stabilizer mixture of components (i) and (ii), and where applicable further additives, may be incorporated into the organic polymeric material to be stabilized in pure form or encapsulated in waxes, oils or polymers.

The stabilizer mixture of components (i) and (ii), and where applicable further additives, may also be sprayed onto the organic polymeric material to be stabilized. The mixture can be used to dilute other additives (e.g. the above-mentioned conventional additives) or melts thereof, so that it is also possible for the mixture to be sprayed together with those additives onto the organic polymeric material to be stabilized. Addition by spraying during the deactivation of the polymerisation catalysts is especially advantageous, it being possible, for example, for the vapour used for the deactivation to be utilised for the spraying.

For example, where the organic polymeric materials are polymerized in the form of beads, it may be advantageous for the stabilizer mixture of components (i) and (ii), and where applicable other additives, to be applied by spraying.

The organic polymeric materials stabilized in that manner may be used in an extremely wide variety of forms, e.g. in the form of films, fibres, tapes, moulding compounds or profiles, or as binders for surface-coatings, especially powder coatings, adhesives or cements.

The organic polymeric materials stabilized in that manner may likewise be used in an extremely wide variety of forms, especially in the form of thick-layer polyolefin moulded articles that are in lasting contact with extracting media, such as, for example, pipes for liquids or gases, films, fibres, geomembranes, tapes, profiles or tanks.

The organic polymeric material compositions according to the present invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film, pipe, profile, bottle, tank or container, fiber containing a composition as described above.

A film is preferred. The film can be prepared as a blown film cast film or via extrusion coating. Especially preferred is a multilayer film.

A further embodiment of the present invention relates to a molded article containing a composition as described above. The molding is in particular effected by injection, blow, compression, roto-molding or slush-molding or extrusion.

The present invention relates also to a process for stabilizing an organic material against oxidative, thermal or light-induced degradation, which comprises incorporating therein or applying thereto at least a mixture of components (i) and (ii).

A preferred embodiment of the present invention is likewise the use of a mixture of components (i) and (ii) as stabilizers, especially processing stabilizers (thermostabilizers), for organic materials against oxidative, thermal or light-induced degradation.

The preferred mixture of components (i) and (ii) for use as stabilizer and the process for stabilizing are the same as those described for the compositions comprising an organic material.

The following Examples illustrate the invention further. Parts or percentages relate to weight.

The following types of unstabilized polyethylene used in the examples described hereunder are summarized in Table 1.

TABLE 1

Polyethylenes used

| Polyethylene | Type of polyethylene |
|---|---|
| PE-1 | PE-LLD (C-4), prepared with Ti-catalyst<br>MFI = 3 g/10 min (190° C./5 kg)<br>MFI = 8.5 g/10 min (190° C./10 kg) |
| PE-2 | PE-HD, prepared with Ti-catalyst<br>MFI = 9 g/10 min (190° C./2.16 kg)<br>MFI = 24 g/10 min (190° C./5 kg) |
| PE-3 | PE-MD, prepared with metallocene catalyst<br>MFI = 6 g/10 min (190° C./2.16 kg)<br>MFI = 15 g/10 min (190° C./5 kg) |
| PE-4 | PE-HD, prepared with Cr-catalyst<br>MFI = 2.2 g/10 min (190° C./5 kg) |
| PE-5 | PE-MD (C-6)<br>MFI = 3.3 g/10 min (190° C./2.16 kg) |

The various additives tested are used as received from the respective suppliers as depicted in Table 2.

TABLE 2

Additives used

| Code | Tradename | Manufacturer |
|---|---|---|
| EOA-1 | Armostat 1800 (RTM)a) | Akzo Nobel Chem. Inc. |
| EOA-2 | Atmer 163 (RTM)b) | Uniqema |
| PS-1 | Irganox E201 (RTM)c) | Ciba Specialty Chemicals Inc. |
| PS-2 | FS-042 (RTM)d) | Ciba Specialty Chemicals Inc. |
| P-1 | Irgafos 168 (RTM)e) | Ciba Specialty Chemicals Inc. |
| P-2 | Irgafos 38 (RTM)f) | Ciba Specialty Chemicals Inc. |
| P-3 | Irgafos 126 (RTM)g) | Ciba Specialty Chemicals Inc. |
| P-4 | Irgafos P-EPQ (RTM)h) | Ciba Specialty Chemicals inc. |
| AS-1 | Zinc stearate | Bärlocher |
| AS-2 | Zinc octoate | Bärlocher |
| AO-1 | Irganox 1076 (RTM)i) | Ciba Specialty Chemicals Inc. |
| AO-2 | Irganox 1010 (RTM)j) | Ciba Specialty Chemicals Inc. |
| AO-3 | Irganox 3790 (RTM)k) | Ciba Specialty Chemicals Inc. |
| AO-4 | Irganox 3114 (RTM)l) | Ciba Specialty Chemicals Inc. |
| HALS-1 | Chimassorb 2020 (RTM)m) | Ciba Specialty Chemicals Inc. |
| HALS-2 | Chimassorb 119 (RTM)n) | Ciba Specialty Chemicals Inc. |
| HALS-3 | Tinuvin 783 (RTM)o) | Ciba Specialty Chemicals Inc. | a)Armostat 1800 (RTM) is stearyldiethanolamine.
b)Atmer 163 (RTM) is a compound of the formula Va

(Va)

wherein $R_6$ is a mixture of $C_{13}$alkyl and $C_{15}$alkyl; and $R_7$ and $R_8$ are —$CH_2CH_2OH$ [$C_{13}/C_{15}$alkyldiethanolamine].
c)Irganox E201 (RTM) is a compound of the formula I (I)

wherein $R_1$ is

—$(CH_2)_3$—CH—$(CH_2)_3$—CH—$(CH_2)_3$—CH—$(CH_3)_2$
    |                |                |
    $CH_3$         $CH_3$         $CH_3$

[tocopherols, for example α-tocopherol, β-tocopherol, γ-tocopherol, δ-tocopherol and mixtures thereof (vitamin E)].
d)FS-042 (RTM) is N,N-di(alkyl)-hydroxylamine produced by the direct oxidation of N,N-di(hydrogenated tallow)amine.
e)Irgafos 168 (RTM) is tris(2,4-di-tert-butylphenyl) phosphite.
f)Irgafos 38 (RTM) is bis(2,4-di-tert-butyl-6-methylphenyl)ethyl phosphite.
g)Irgafos 126 (RTM) is bis(2,4-di-tert-butylphenyl)pentaerythritol diphosphite.
h)Irgafos P-EPQ (RTM) is tetrakis(2,4-di-tert-butylphenyl)4,4'-biphenylene diphosphonite.
i)Irganox 1076 (RTM) is a compound of the formula AO-1

(AO-1)

j)Irganox 1010 (RTM) is a compound of the formula AO-2

(AO-2)

k)Irganox 3790 (RTM) is a compound of the formula AO-3

(AO-3)

l)Irganox 3114 (RTM) is a compound of the formula AO-4

(AO-4)

m)Chimassorb 2020 (RTM) is is a block oligomeric hindered amine light stabilizer of the formula HALS-1

TABLE 2-continued

Additives used

| Code | Tradename | Manufacturer |
|---|---|---|

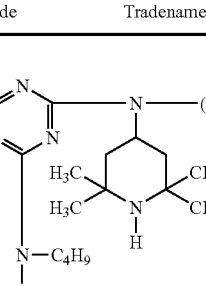

with a molecular weight of 2600-3400. The preparation of Chimassorb 2020 (RTM) is disclosed for example in Example 10 of U.S. 6,046,304.
n)Chimassorb 119 (RTM) is a compound of the formula HALS-2

(HALS-2)

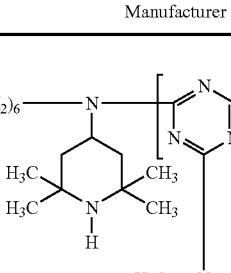

o)Tinuvin 783 (RTM) is a synergistic mixture of Chimassorb 944 (RTM)p) and Tinuvin 622 (RTM)q) both sold by Ciba Specialty Chemicals Inc.
p)Chimassorb 944 (RTM) is a compound of the formula HALS-4

(HALS-4)

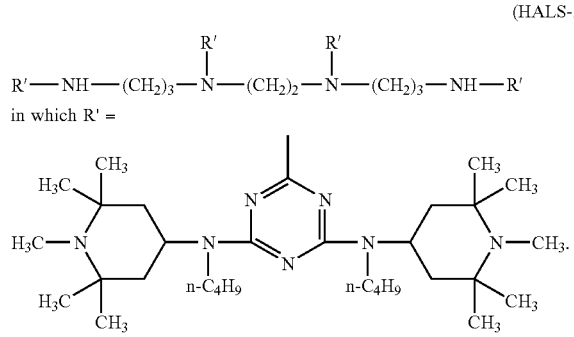

in which m is a number from the range from 2 to 200.
q)Tinuvin 622 (RTM) is a compound of the formula HALS-5

TABLE 2-continued

Additives used

| Code | Tradename | Manufacturer |
|---|---|---|

(HALS-5)

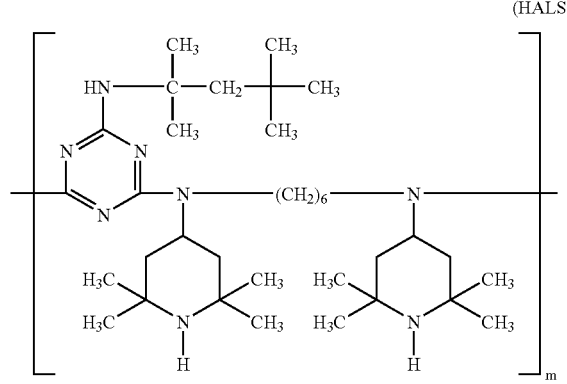

in which m is a number from the range from 2 to 200.

The tested samples are prepared as follows: In each case 100 parts of the different types of polyethylenes are dry-blended with the tested additives. This blend is then extruded in a twin-screw extruder of Berstorff® (ZSK 25, L/D=45) at temperatures as given below in Table 3. The extrudate is cooled by drawing it through a water bath and then granulated. This granulate is repeatedly extruded. Usually after 3 or 5 extrusions, the melt index is measured (at 190° C./2.16 kg). The unstabilized resins are also processed through the extruder so that all materials have the same heat history. After three or five extrusion passes the materials are assessed in respect of color quality and change of molecular weight.

The color quality is reported in terms of Yellowness Index (YI) determined on the granules in accordance with the ASTM 1926-70 Yellowness Test. Low YI values denot little discoloration, high YI values severe discoloration of the samples.

The change of the molecular weight is reported in terms of the melt flow index (MFI) according to the ASTM-D-1238-70, measured in a Göttfert melt flow indexer and loads as given below. Experiment errors of the MFI measurements are found to be ±0.03 for the MFI measured at 190° C. and 2.16 kg load, ±0.06 for the MFI measured at 190° C. and 5 kg load and ±0.1 for the MFI measured at 190° C. and 10 kg load. A substantial decrease in the melt index denotes poor stabilization.

Low-temperature impact properties have been tested at −40° C. according to the ASTM D 3763. Samples are rotationally molded 3.175 mm plaques. Ten replicates are performed for this test.

TABLE 3

Additional conditions of the sample preparations

| Example | Type of PE | Extrusion Temperature |
|---|---|---|
| Example 1 | PE-1 | 230° C. |
| Example 2 | PE-2 | 260° C. |
| Example 3 | PE-1, PE-2, PE-3, PE-4 | 260° C. |
| Example 4 | PE-5 | 260° C. |
| Example 5 | PE-1 | 230° C. |

EXAMPLE 1

Stabilization of Multiple-Extruded Polyethylene (PE-1)

3.5 kg of polyethylene PE-1 powder are dry-blended with the tested additives. This blend is then extruded in a twin-screw extruder of Berstorff® (ZSK 25, L/D=46) at temperatures of at most 230° C. The extrudate is cooled by drawing it through a water bath and is then granulated. This granulate is repeatedly extruded. After 5 extrusions, the melt flow index (MFI) and Yellowness Index (YI) is measured. The results are summarized in Table 4.

TABLE 4

MFI at 190° C. and 10 kg load

| Example | Additive (ppm) | | YI after 1 extrusion | YI after 5 extrusions | MFI after 1 extrusion | MFI after 5 extrusions |
|---|---|---|---|---|---|---|
| Example 1a[a)] | none | | 1.4 | 5.2 | 8.3 | 5.6 |
| Example 1b[b)] | 500 ppm | EOA-1 | −1.5 | 7.9 | 8.3 | 7.9 |
| | 80 ppm | PS-1 | | | | |
| | 300 ppm | P-1 | | | | |
| Example 1c[b)] | 500 ppm | EOA-1 | −2.1 | 1.3 | 8.3 | 8.3 |
| | 80 ppm | PS-1 | | | | |
| | 300 ppm | P-1 | | | | |
| | 500 ppm | AS-1 | | | | |
| Example 1d[b)] | 500 ppm | EOA-1 | −2.3 | 3.0 | 8.5 | 8.4 |
| | 80 ppm | PS-1 | | | | |
| | 300 ppm | P-1 | | | | |
| | 500 ppm | AS-2 | | | | |
| Example 1e[b)] | 500 ppm | EOA-2 | −2.3 | 1.7 | 8.4 | 8.3 |
| | 80 ppm | PS-1 | | | | |
| | 300 ppm | P-1 | | | | |
| | 500 ppm | AS-1 | | | | |
| Example 1f[b)] | 500 ppm | EOA-1 | −2.7 | 2.5 | 8.2 | 8.1 |
| | 80 ppm | PS-2 | | | | |
| | 300 ppm | P-1 | | | | |
| | 500 ppm | AS-1 | | | | |
| Example 1g[b)] | 500 ppm | EOA-1 | −2.1 | 1.3 | 8.3 | 8.3 |
| | 80 ppm | PS-1 | | | | |
| | 600 ppm | P-1 | | | | |
| | 500 ppm | AS-1 | | | | |
| Example 1h[b)] | 500 ppm | EOA-1 | −2.1 | 1.0 | 8.4 | 8.3 |
| | 80 ppm | PS-1 | | | | |
| | 300 ppm | P-2 | | | | |
| | 500 ppm | AS-1 | | | | |
| Example 1i[b)] | 500 ppm | EOA-1 | −2.1 | 0.8 | 8.4 | 8.4 |
| | 80 ppm | PS-1 | | | | |
| | 300 ppm | P-3 | | | | |
| | 500 ppm | AS-1 | | | | |
| Example 1j[b)] | 500 ppm | EOA-1 | −2.3 | 1.0 | 8.5 | 8.3 |
| | 80 ppm | PS-1 | | | | |
| | 300 ppm | P-4 | | | | |
| | 500 ppm | AS-1 | | | | |
| Example 1k[b)] | 500 ppm | EOA-1 | −2.1 | 2.0 | 8.4 | 8.3 |
| | 80 ppm | PS-1 | | | | |
| | 300 ppm | P-1 | | | | |
| | 500 ppm | AS-1 | | | | |
| | 300 ppm | AO-1 | | | | |
| Example 1l[b)] | 500 ppm | EOA-1 | −2.3 | 2.2 | 8.3 | 8.3 |
| | 80 ppm | PS-1 | | | | |
| | 300 ppm | P-1 | | | | |
| | 500 ppm | AS-1 | | | | |
| | 300 ppm | AO-2 | | | | |
| Example 1m[b)] | 500 ppm | EOA-1 | −1.3 | 5.2 | 8.3 | 8.4 |
| | 80 ppm | PS-1 | | | | |
| | 300 ppm | P-1 | | | | |
| | 500 ppm | AS-1 | | | | |
| | 3000 ppm | HALS-1 | | | | |
| Example 1n[b)] | 500 PPM | EOA-1 | −1.4 | 3.6 | 8.3 | 8.3 |
| | 80 ppm | PS-1 | | | | |
| | 300 ppm | P-1 | | | | |
| | 500 ppm | AS-1 | | | | |
| | 3000 ppm | HALS-2 | | | | |

[a)]Comparative Example.
[b)]Example according to the invention.

EXAMPLE 2

Stabilization of Multiple-Extruded Polyethylene (PE-2)

2.5 kg of polyethylene PE-2 powder are dry-blended with the tested additives. This blend is then extruded in a twin-screw extruder of Berstorff® (ZSK 25, L/D=46) at temperatures of at most 260° C. The extrudate is cooled by drawing it through a water bath and then granulated. This granulate is repeatedly extruded. After 3 extrusions, the melt flow index (MFI) and Yellowness Index (YI) are measured. The results are summarized in Table 5.

TABLE 5

MFI at 190° C. and 2.16 kg load

| Example | Additive (ppm) | | YI after 1 extrusion | YI after 3 extrusions | MFI after 1 extrusion | MFI after 3 extrusions |
|---|---|---|---|---|---|---|
| Example 2a[a)] | 500 ppm | EOA-1 | 0.6 | 7.1 | 8.3 | 7.0 |
| | 500 ppm | AS-1 | | | | |
| Example 2b[a)] | 1000 ppm | PS-1 | 18.3 | 27.0 | 7.6 | 6.6 |
| | 500 ppm | AS-1 | | | | |
| Example 2c[a)] | 300 ppm | PS-1 | 9.9 | 17.5 | 7.3 | 6.2 |
| | 500 ppm | AS-1 | | | | |
| Example 2d[b)] | 700 ppm | EOA-1 | 5.9 | 12.7 | 8.3 | 7.7 |
| | 300 ppm | PS-1 | | | | |
| | 500 ppm | AS-1 | | | | |
| Example 2e[b)] | 350 ppm | EOA-1 | 4.3 | 10.1 | 8.5 | 8.2 |
| | 300 ppm | PS-1 | | | | |
| | 350 ppm | P-1 | | | | |
| | 500 ppm | AS-1 | | | | |
| Example 2f[b)] | 300 ppm | PS-1 | 7.6 | 13.0 | 8.5 | 8.3 |
| | 700 ppm | P-1 | | | | |
| | 500 ppm | AS-1 | | | | |
| Example 2g[b)] | 75 ppm | PS-1 | 2.7 | 8.5 | 6.8 | 4.8 |
| | 500 ppm | AS-1 | | | | |
| Example 2h[b)] | 925 ppm | EOA-1 | 2.4 | 8.4 | 8.5 | 8.2 |
| | 75 ppm | PS-1 | | | | |
| | 500 ppm | AS-1 | | | | |
| Example 2i[b)] | 695 ppm | EOA-1 | 0.9 | 7.7 | 8.6 | 8.3 |
| | 75 ppm | PS-1 | | | | |
| | 230 ppm | P-1 | | | | |
| | 500 ppm | AS-1 | | | | |
| Example 2j[b)] | 460 ppm | EOA-1 | 0.5 | 7.3 | 8.7 | 8.3 |
| | 75 ppm | PS-1 | | | | |
| | 460 ppm | P-1 | | | | |
| | 500 ppm | AS-1 | | | | |
| Example 2k[b)] | 230 ppm | EOA-1 | 0.3 | 4.8 | 8.5 | 8.1 |
| | 75 ppm | PS1 | | | | |
| | 695 ppm | P-1 | | | | |
| | 500 ppm | AS-1 | | | | |
| Example 2l[b)] | 75 ppm | PS-1 | 2.5 | 7.8 | 8.5 | 7.6 |
| | 925 ppm | P-1 | | | | |
| | 500 ppm | AS-1 | | | | |

[a)]Comparative Example.
[b)]Example according to the invention.

EXAMPLE 3

Stabilization of Multiple-Extruded Polyethylene (PE-1-PE-4)

2 kg of a polyethylene powder according to Table 6 is dry-blended with the tested additives. This blend is then extruded in a twin-screw extruder of Berstorff® (ZSK 25, L/D=46) at temperatures of at most 260° C. The extrudate is cooled by drawing it through a water bath and then granulated. This granulate is repeatedly extruded. After 3 extrusions, the melt flow index (MFI) and Yellowness Index (YI) is measured. The results are summarized in Table 6.

TABLE 6

MFI at 190° C. and 5 kg load

| Example | PE type | Additive (ppm) | YI after 1 extr. | YI after 3 extr. | MFI after 1 extr. | MFI after 3 extr. |
|---|---|---|---|---|---|---|
| Example 3a[a] | PE-2 | 500 ppm P-1<br>500 ppm AS-1<br>1000 ppm AO-1 | 2.0 | 5.4 | 23.0 | 18.1 |
| Example 3b[a] | PE-2 | 75 ppm PS-1<br>300 ppm P-1<br>500 ppm AS-1 | 2.9 | 5.1 | 21.7 | 16.0 |
| Example 3c[b] | PE-2 | 500 ppm EOA-1<br>75 ppm PS-1<br>300 ppm P-1<br>500 ppm AS-1 | 2.7 | 8.5 | 23.9 | 23.4 |
| Example 3d[a] | PE-4 | 500 ppm P-1<br>500 ppm AS-1<br>1000 ppm AO-1 | −0.2 | 2.6 | 1.7 | 1.1 |
| Example 3e[a] | PE-4 | 75 ppm PS-1<br>300 ppm P-1<br>500 ppm AS-1 | −0.3 | 3.9 | 1.5 | 0.9 |
| Example 3f[b] | PE-4 | 500 ppm EOA-1<br>75 ppm PS-1<br>300 ppm P-1<br>500 ppm AS-1 | −0.3 | 4.9 | 1.6 | 1.1 |
| Example 3g[a] | PE-1 | 500 ppm P-1<br>500 ppm AS-1<br>1000 ppm AO-1 | 0.2 | 2.8 | 3.2 | 2.7 |
| Example 3h[a] | PE-1 | 75 ppm PS-1<br>300 ppm P-1<br>500 ppm AS-1 | 0.3 | 3.2 | 3.0 | 2.4 |
| Example 3i[b] | PE-1 | 500 ppm EOA-1<br>75 ppm PS-1<br>300 ppm P-1<br>500 ppm AS-1 | −0.9 | 4.3 | 3.0 | 2.7 |
| Example 3j[a] | PE-3 | 500 ppm P-1<br>500 ppm AS-1<br>1000 ppm AO-1 | −2.1 | −0.4 | 14.7 | 13.0 |
| Example 3k[a] | PE-3 | 75 ppm PS-1<br>300 ppm P-1<br>500 ppm AS-1 | −2.0 | 1.9 | 14.4 | 11.8 |
| Example 3l[b] | PE-3 | 500 ppm EOA-1<br>75 ppm PS1<br>300 ppm P-1<br>500 ppm AS-1 | −0.7 | 5.7 | 14.8 | 13.1 |

[a] Comparative Example.
[b] Example according to the invention.

EXAMPLE 4

Rotomolding of Polyethylene (PE-5)

5 kg of polyethylene PE-5 powder are dry-blended with the tested additives. The blend is then extruded in a twin-screw extruder of Berstorff® (ZSK 25, L/D=46) at temperatures of at most 260° C. The extrudate is cooled by drawing it through a water bath and then granulated. This granulate is subsequently ground. The particle size of the polymer is from 350 to 500 μm.

The actual rotomolding process or rotational molding process, which permits the production of fairly large three-dimensional solids, is carried out in a Clamshell type rotomolding FSP M20. In this machine, a cast aluminum mold, which is mounted on an arm and into which the plastic sample is filled (shot weight 1375 g), is heated with a gas burner with circulation of the hot air over 10 minutes to 287.5° C. and is kept at this temperature for 16 minutes. Subsequently the oven is opened and the mold is cooled first for 7 minutes with circulating air, then for 7 minutes by spraying with water (mist) and finally for another 2 minutes with circulating air. During the entire heating and cooling process, the mold, which is mounted on two axes at right angles to each other, is rotated, the speed of the main axis being kept at 6 revolutions per minute and the rotational ratio being 4.5:1. After cooling the lid of the mold is opened and the resultant hollow article is taken out. The yellowness index (YI) of the exterior of the molded articles is determined. Low YI values denote little discoloration, high YI values strong discoloration of the samples. The less discoloration, the more effective the stabilizer. The results are summarized in Table 7.

TABLE 7

MFI at 190° C. and 2.16 kg load

| Example | PE type | Additive (ppm) | YI after comp. | MFI after comp. | YI outer surface | Imp. Resistance (m · kg) |
|---|---|---|---|---|---|---|
| Example 4a[a] | PE-5 | 1000 ppm P-1<br>500 ppm AS-1<br>500 ppm AO-3<br>2000 ppm HALS-3 | 0.1 | 3.2 | 42.3 | 2.53 |
| Example 4b[b] | PE-5 | 100 ppm EOA-1<br>150 ppm PS-1<br>1000 ppm P-1<br>500 ppm AS-1<br>150 ppm AO-4<br>2000 ppm HALS-3 | −0.4 | 3.2 | 42.7 | 3.36 |

[a] Comparative Example.
[b] Example according to the invention.

EXAMPLE 5

Stabilization of Multiple-Extruded Polyethylene (PE-1)

3.5 kg of polyethylene PE-1 powder are dry-blended with the tested additives. This blend is then extruded in a twin-screw extruder of Berstorff® (ZSK 25, L/D=46) at temperatures of at most 230° C. The extrudate is cooled by drawing it through a water bath and is then granulated. This granulate is repeatedly extruded. After 5 extrusions, the melt flow index (MFI) and Yellowness Index (YI) is measured. The results are summarized in Table 8.

TABLE 8

MFI at 190° C. and 10 kg load

| Example | Additive (ppm) | YI after 1 extrusion | YI after 5 extrusions | MFI after 1 extrusion | MFI after 5 extrusions |
|---|---|---|---|---|---|
| Example 5a[a] | none | 3.2 | 9.6 | 7.9 | 5.2 |
| Example 5b[b] | 500 ppm EOA-1<br>80 ppm PS-1 | −1.1 | 10.9 | 8.2 | 7.4 |
| Example 5c[b] | 500 ppm EOA-1<br>300 ppm PS-2 | −1.2 | 8.9 | 8.2 | 6.6 |
| Example 5d[b] | 500 ppm EOA-2<br>80 ppm PS-1 | −0.8 | 10.8 | 8.2 | 6.9 |

[a] Comparative Example.
[b] Example according to the invention.

What is claimed is:

1. A mixture comprising
   i) a compound of the formula I

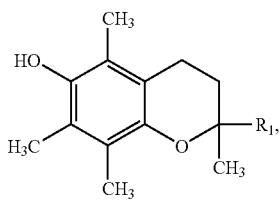

wherein $R_1$ is 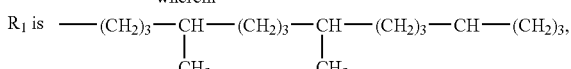

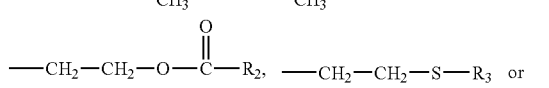, —CH$_2$—CH$_2$—S—R$_3$ or

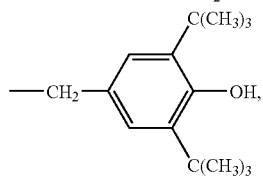

$R_2$ is $C_7$-$C_{30}$alkyl,
$R_3$ is $C_1$-$C_{30}$alkyl, and
   ii) an antistatic agent selected from the group consisting of an ethoxylated amide and a compound of the formula V

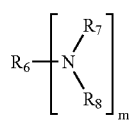

wherein,
$R_6$ is $C_{11}$-$C_{20}$alkyl or $C_{11}$-$C_{20}$alkanoyl,
$R_7$ is hydrogen or

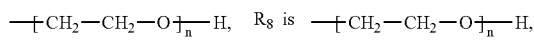

m is 1, and
n is 1.

2. A mixture according to claim 1, comprising in addition, besides components (i) and (ii), further additives selected from the group consisting of phenolic antioxidants, further processing stabilizers, light-stabilizers and acid scavengers.

3. A mixture according to claim 1, comprising as a further component (iii) a phosphite, a phosphonite or a triarylphosphite.

4. A mixture according to claim 3, wherein component (iii) is tris(2,4-di-tert-butylphenyl)phosphite, bis(2,4-di-tert-butyl-6-methylphenyl)ethyl phosphite, bis(2,4-di-tert-butylphenyl)pentaerythritol diphosphite, bis(2,4-dicumylphenyl)pentaerythritol diphosphite, tris(nonylphenyl) phosphite or tetrakis(2,4-di-tert-butylphenyl)4,4'-biphenylene diphosphonite.

5. A mixture according to claim 1, comprising as component (i) a compound of the formula I, wherein $R_1$ is 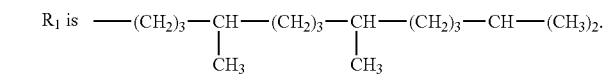

6. A mixture according to claim 1, wherein component (i) is a compound of the formula I
wherein $R_1$ is 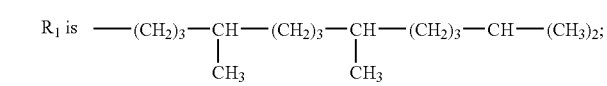

and component (ii) is a $C_{13}$-$C_{18}$-alkyl-diethanolamine.

7. A composition comprising
   a) an organic material which is susceptible to oxidative, thermal or light-induced degradation, and
   b) a mixture of components (i) and (ii) according to claim 1.

8. A composition according to claim 7, wherein component (a) is a synthetic polymer.

9. A composition according to claim 7, wherein component (a) is a polyolefin.

10. A composition according to claim 7, wherein component (a) is polyethylene or polypropylene or mixture thereof.

11. A composition according to claim 7, wherein component (b) is present in an amount of from 0.001 to 5%, based on the weight of component (a).

12. A shaped article containing a mixture according to claim 1.

13. A process for stabilizing an organic material against oxidative, thermal or light-induced degradation, which comprises incorporating therein or applying thereto at least a mixture according to claim 1.

* * * * *

UNITED STATES PATENT AND TRADEMARK OFFICE
CERTIFICATE OF CORRECTION

PATENT NO. : 7,375,149 B2 Page 1 of 1
APPLICATION NO. : 10/526106
DATED : May 20, 2008
INVENTOR(S) : Bruno Rotzinger et al.

It is certified that error appears in the above-identified patent and that said Letters Patent is hereby corrected as shown below:

On title page

Item (75) should read:

-- Bruno Rotzinger, Birsfelden (CH); Kurt Hoffmann, Weitenau-Steinen (DE); Dietmar Mäder, Freiburg (DE); Neil Dunski, St. Louis, MO (US) --.

Signed and Sealed this

Fifth Day of August, 2008

JON W. DUDAS
*Director of the United States Patent and Trademark Office*